INVENTOR
EDMOND B. LYNCH

Nov. 12, 1968 — E. B. LYNCH — 3,410,138
WIDE RANGE FLOW METER
Filed April 15, 1966 — 2 Sheets-Sheet 2

INVENTOR
EDMOND B. LYNCH

BY Dodge and Sons

ATTORNEYS

United States Patent Office 3,410,138
Patented Nov. 12, 1968

3,410,138
WIDE RANGE FLOW METER
Edmond B. Lynch, Greenville, R.I., assignor to General Signal Corporation, a corporation of New Jersey
Filed Apr. 15, 1966, Ser. No. 542,783
12 Claims. (Cl. 73—197)

ABSTRACT OF THE DISCLOSURE

A wide range flow meter comprising a pair of primary elements of the differential pressure-producing type arranged in series in the flow line, and a secondary element including a single transducer which serves both primaries. The low flow primary element is incorporated in the vane of a butterfly valve. Means, under the control of the secondary element, closes the butterfly valve and connects the low flow primary with the transducer in the low flow portion of the metering range, and opens the valve and connects the other primary with the transducer in the high flow portion of the metering range.

---

This invention relates to fluid flow meters of the type employing a differential pressure producer as the primary measuring element.

One disadvantage of this type of instrument is that its flow metering range is limited to about 10:1, i.e., the minimum flow rate which can be metered successfully cannot be less than about one-tenth the maximum flow rate. There are two reasons for this. First, since the range of pressure differentials, which the secondary element of the meter must transduce, varies with the square of the flow range, transducing errors, which may be small in an absolute sense, quickly becomes intolerably high proportions of the pressure differentials produced at the low end of the flow range as this range is widened. At the present state of the art, the required degree of accuracy cannot be maintained over the entire flow range when the range of pressure differentials exceeds about 100:1. Second, the flow range of the meter is limited because of the inherent characteristics of the primary elements themselves. Primaries, such as the thin plate orifice having a beta below about 0.4, which have constant discharge coefficients at Reynolds numbers between 10,000 and 1,000,000, cause excessive head losses when used at high rates of flow. On the other hand, devices, such as the thin plate orifice having a beta greater than 0.4, the Venturi, and the Dall tube, which are accurate and efficient primaries at high flow rates, are not suitable for use at low Reynolds numbers because their discharge coefficients do not remain constant.

The object of this invention is to provide a relatively simple flow meter of the differential pressure producing type which employs a conventional sceondary element having the usual pressure differential handling capacity, but which is capable of accurately and efficiently measuring flow rates over ranges much greater than the 10:1 range which characterizes prior instruments. According to the invention, the improved meter includes two differential-producing primary elements which are designed and sized for operation exclusively in the low flow and high flow portions, respectively, of the metering range, and which are rendered effective alternately at the appropriate flow rates by means under the control of the secondary measuring element. The low flow primary is a metering orifice positioned in a passage extending through the vane of a buterfly valve located in the flow line. Therefore, this primary meters the line flow only when the butterfly valve is closed. At other times, it causes no significant loss in head. The high flow primary, on the other hand, in a Venturi or some other efficient high flow measuring device which is permanently located in the flow line in series with the butterfly valve. The secondary element includes a readout device, which may indicate or record the flow rate, totalize the flow, or perform several of these functions, and which is operated by a single differential pressure transducer which services both of the primaries. In the upper portion of the metering range, the secondary element automatically initiates opening of the butterfly valve and connection of the pressure taps of the high flow primary with the transducer. This action puts the high flow primary in control and effectively removes the low flow primary from the flow line. In the lower portion of the metering range, the secondary automatically causes the butterfly valve to close, and thereby brings the low flow primary into metering position, and causes the pressure taps of this element to be connected with the transducer.

Since the two primaries are serviced by a single differential pressure transducer, it is essential that each be designed to produce, in the flow range in which it is used, a range of pressure differentials which the transducer can handle accurately. Moreover, it also is essential that the sizes and characteristics of the two primaries be so correlated that the minimum pressure differential produced by the high flow primary is intermediate the minimum and maximum pressure differentials produced by the low flow primary. In the preferred embodiment, the ranges of pressure differentials produced by the primaries are identical, and correspond to the maximum range which the secondary element can transduce, because this arrangement affords the largest overall flow metering range. Thus, an improved meter using a secondary element which can transduce accurately differentials corresponding to a flow range of 10:1, will be able to handle a total flow range of 100:1.

Although the invention is useful in any installation where accurate metering of a flow range substantially greater than 10:1 is required, it is particularly suited to use in connection with measuring flow through the main line of a municipal water distribution system. The large pipe diameters and extremely high flow rates which characterize these systems make in-line metering particularly attractive. Therefore, since the present meter can easily handle the 50:1 to 100:1 flow ranges commonly encountered in water distribution systems, the new meter finds a natural home in this environment. Furthermore, in cases where the distribution lines feed a growing community, the wide range flow capacity of the new meter is of great importance because it affords accurate metering throughout a long period of growth without the necessity for reworking or disrupting service through the main line. In the past, the metering capacity required to handle the anticipated large flow rates of the future could be provided at the time of installation of the main line only by use of complex and very expensive parallel branch metering installations.

The preferred embodiment is described herein with reference to the acompanying drawings in which.

Figure 1:
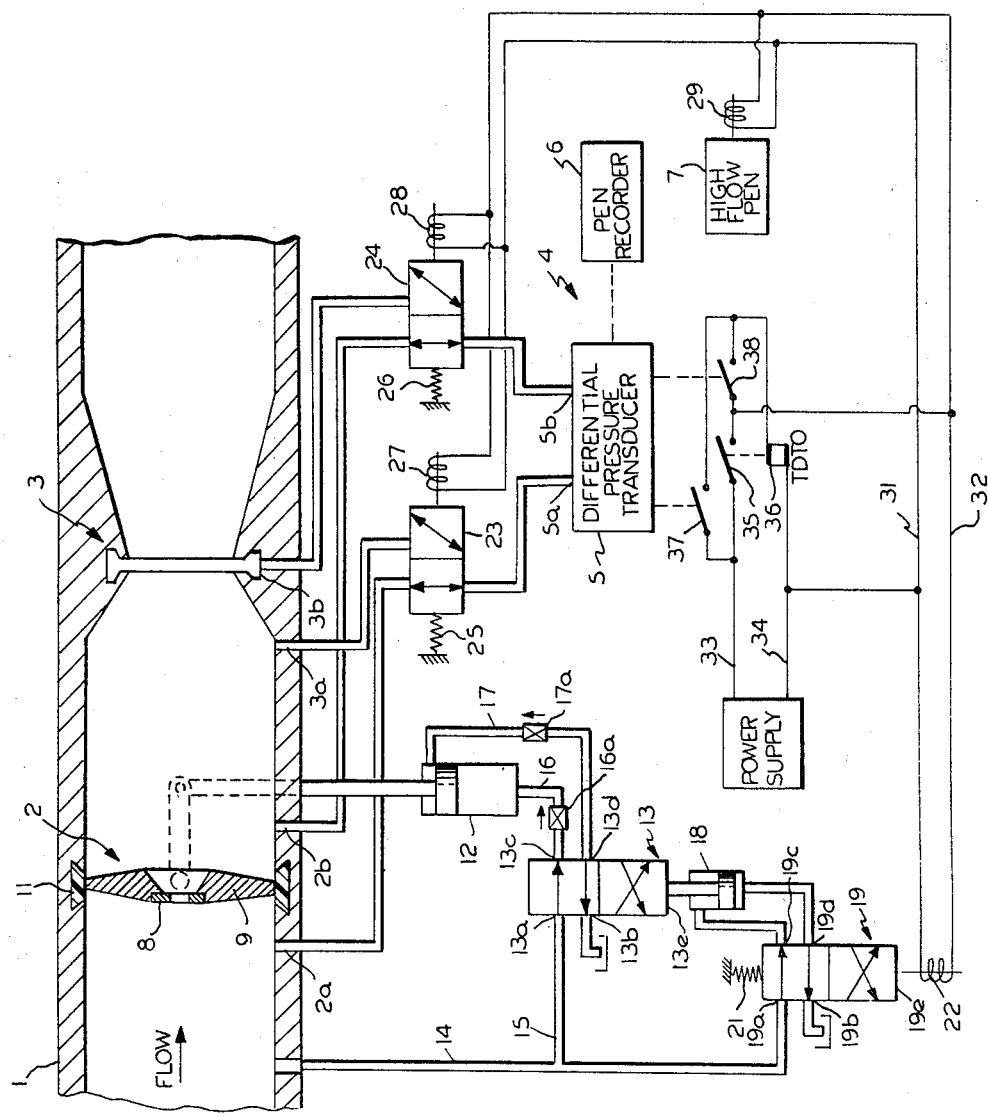
FIG. 1 is a schematic diagram of the improved meter.
Figure 2:
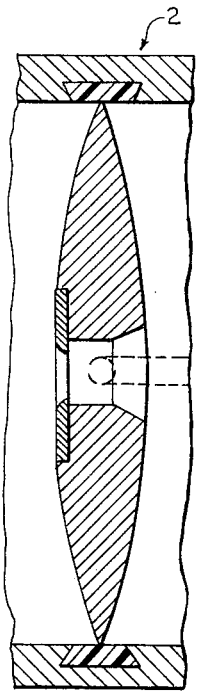
FIGS. 2 and 3 are sectional views of alternative forms of primary 2.
Figure 3:
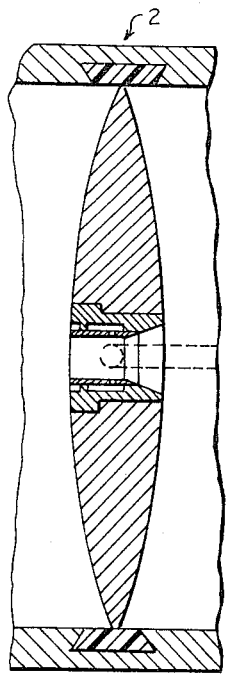
Figure 4:
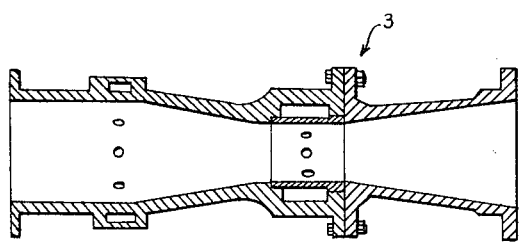
FIGS. 4–6 are sectional views of alternative forms of primary 3.
Figure 5:
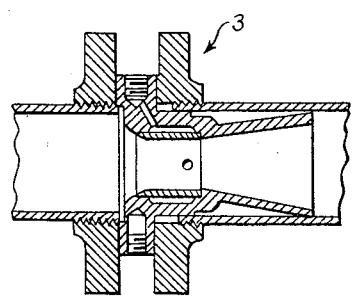
Figure 6:
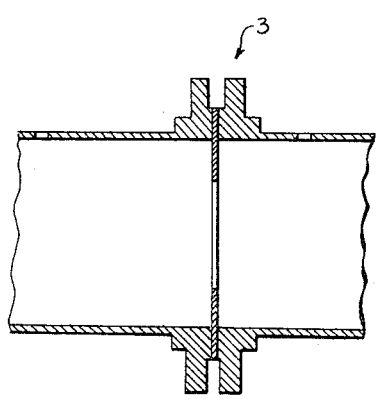

As shown in the drawings, the improved meter is arranged to measure the rate of flow through pipe 1 and comprises a pair of in-line primary measuring elements 2 and 3, and a secondary element 4 which includes a single pressure transducer 5, a pen recorder 6, and a high flow marking pen 7. The low flow primary 2 consists of a metering orifice 8 which is mounted in a flow passage extending through the vane 9 of a butterfly valve, and a pair of pressure taps 2a and 2b. The orifice 8 is automatically rendered effective and ineffective as a sensing element when the butterfly valve is closed and opened, respectively. The vane 9 is designed to close tightly against its rubber seat 11 in order to prevent by-passing of orifice 8 when the valve is closed. This insures accurate flow measurement. Although primary 2 usually employs a thin plate orifice, at extremely low Reynolds numbers, better accuracy can be obtained by using a quadrant orifice (FIG. 2) or a Schlag-Jorissen flow tube (FIG. 3). Primary measuring element 3 consists of a differential producer which is efficient, i.e., incurs small head losses, at high flow rates, and a pair of pressure taps 3a and 3b. The illustrated differential producer is a special Venturi known as a Dall tube and described in U.S. Patent 2,704,555. Other suitable devices are the conventional Venturi (FIG. 4), the flow nozzle (FIG. 5) and the thin plate orifice (FIG. 6).

Vane 9 of the butterfly valve can be actuated by any of various known valve operators. The operator chosen for illustration is hydraulically powered and includes a double-acting cylinder 12 and a four-way, directional control valve 13. Valve 13 includes an inlet port 13a which is supplied with liquid from pipe 1 through conduits 14 and 15, an exhaust port 13b which is connected to a drain, and a pair of outlet ports 13c and 13d which are connected by conduits 16 and 17 with the head and rod ends, respectively, of the cylinder. The speed of movement of the vane 9 is controlled by one-way flow restrictors 16a and 17a which permit free flow from valve 13 to the cylinder, but throttle flow in the reverse direction. The movable element 13e of valve 13 has two operative positions; in the first, which is illustrated, it connects the inlet and exhaust ports 13a and 13b with the outlet ports 13c and 13d, respectively, and in the second, it reverses the connections between the inlet and exhaust ports and the two outlet ports. Element 13e is shifted between these two positions by a double-acting piston motor 18 which is controlled by a second two-position, four-way valve 19. The movable element 19e of valve 19 is biased by spring 21 to the illustrated position, wherein the rod and head ends of motor 18 are pressurized and vented, respectively, and is shifted to its other operative position by solenoid 22. Thus, whenever the solenoid 22 is de-energized, valves 13 and 19 assume their illustrated positions, and cylinder 12 holds valve 9 in its closed position. On the other hand, when solenoid 22 is energized, valve 19 pressurizes and vents the head and rod ends, respectively, of motor 18, this motor shifts the movable element 13e of valve 13 to its second operative position to thereby pressurize and vent the rod and head ends, respectively, of cylinder 12, and the cylinder moves vane 9 to its open position.

The pressure taps of the two primary elements 2 and 3 are selectively connected with the high and low pressure input connections 5a and 5b, respectively, of transducer 5 through a pair of identical selector valves 23 and 24; the valve 23 serving to connect high pressure connection 5a alternatively with the upstream taps 2a and 3a, and the valve 24 serving to connect the low pressure connection 5b alternately with the downstream taps 2b and 3b. The selector valves are biased by springs 25 and 26 to positions in which transducer 5 is connected with the taps of primary 2, and are shifted to positions in which the transducer is connected with the taps of primary 3 by a pair of solenoids 27 and 28.

The solenoids 22, 27 and 28 for the valves 19, 23 and 24, respectively, and the solenoid 29, which activates the high flow marking pen 7, are connected in parallel across a pair of electrical leads 31 and 32 so that all are energized and de-energized simultaneously. These leads, in turn, are connected with the electrical power lines 33 and 34 by a circuit controlled by the switch 35 of a relay 36. The coil of relay 36 is energized by two parallel circuits, one being controlled by switch 37, and the other being controlled by switches 35 and 38. The switches 37 and 38 are operated by the differential pressure transducer 5 and determine the flow rates at which control shifts from primary 2 to primary 3 and vice versa. Transducer 5 closes switch 37 when it receives the maximum differential which primary 2 is intended to produce, and closes switch 38 when it receives a differential just slightly below the minimum differential which the high flow primary is to produce. Relay 36 preferably is of the time delay type in order to prevent undue oscillation of the butterfly valve as a result of momentary changes in flow rate in the region of the switchover flow rate. This is particularly important when the meter is employed in large pipes, such as those having diameters on the order of 30" to 60" or larger, because operation of the butterfly valve is accompanied by very large changes in the hydraulic loads imposed on the system.

The secondary 4 affords a local record of flow rate, and employs a single pen recorder 6 which is driven by the transducer 5. The high flow pen 7 in this embodiment is used merely to mark the flow record, when primary 3 is in control, in order to indicate that the recorded values must be multiplied by a prescribed factor to obtain actual flow rates. While this embodiment will serve to illustrate the principles of the invention, it must be understood that other forms of secondaries can be used. For example, the secondary could include a flow rate indicator or a flow totalizer in addition to or as alternatives for the recorder. Moreover, the transducer 5 can be used to drive alternately a pair of recorders or indicators, one of which is rendered effective when the primary 2 is in control and the other of which is rendered effective when primary 3 is in control. It also is possible to have transducer 5 drive a telemetering transmitter, in addition to or as a substitute for recorder 6, so that remote indications or records of flow rate or total flow are provided. This list of alternatives is not intended to be exhaustive, but it should serve to show that, except for the use of a single transducer, the exact nature of the secondary is not critical.

In order to facilitate description of operation, it is assumed that pipe 1 is a 12" line which carries water at approximately 60° F., that it is desired to measure flow rates between 42 and 4200 g.p.m. (gallons per minute), and that transducer 5 can handle pressure differentials between 2.4" and 240" of water. Under these conditions, primary 3 could be a No. 12–C Dall tube, as manufactured by the B.I.F. Division of the New York Air Brake Company, and it would be used to cover the partial range of 420 to 4200 g.p.m. At the upper limit of the flow range, this device produces a differential of 240" of water. The primary 2, on the other hand, could be a thin plate orifice having a beta of 0.3 (i.e., the ratio of the diameter of the orifice to the diameter of the pipe is 0.3). At 420 g.p.m., this device also produces a differential of 240" of water. Since the switchover flow rate is 420 g.p.m., transducer 5 will be set to close switch 37 when it receives the maximum pressure differential of 240" of water which primary 2 is to produce, and close switch 38 when it receives a differential somewhat less than the minimum of 2.4" of water which primary 3 to produce. For convenience, it is assumed that transducer 5 closes switch 38 at a differential of about 1.9" of water (i.e., at a flow of about 37 g.p.m. on the low scale or 370 g.p.m. on the high scale).

Under zero flow conditions switches 35, 37 and 38 are open and solenoids 22, 27, 28 and 29 are de-energized. Therefore, valves 13, 19, 23 and 24 assume their illustrated positions, and the vane 9 of the butterfly valve is closed. When the flow rate through pipe 1 increases to 37 g.p.m., transducer 5 closes switch 38, but, since switch 35 is still open, this has no immediate effect on the other components of the meter. As the rate of flow increases above 42 g.p.m., transducer 5 commences to drive the pen of recorder 6, and the latter begins to record the flow rate. The pressure differential produced by primary 2 is continually transduced until the rate of flow reaches 420 g.p.m.

At a flow rate of 420 g.p.m., transducer 5 closes switch 37, and thus effects energization of the total coil of relay 36 and closure of switch 35. Since switch 38 was closed at a flow rate of 37 g.p.m., the supply voltage is now impressed across leads 31 and 32, and the solenoids 22 and 27-29 are energized. This produces three changes in the meter. First, solenoid 22 shifts valve 19 to a position in which it reverses the pressures in the opposite ends of motor 18, and thus effects shifting of valve 13 to a position in which it vents and pressurizes the head and rod ends, respectively of cylinder 12. The cylinder, in turn, opens the butterfly valve and effectively removes orifice 8 from the flow line. Second, solenoids 27 and 28 cause valves 23 and 24, respectively, to disconnect transducer 5 from the taps 2a and 2b and to connect it with the taps 3a and 3b of primary 3. Third, solenoid 29 activates the high flow pen 7 and causes it to commence to mark the flow record. The presence of this mark will indicate that the concurrent flow record must be multiplied by a factor of 10 to obtain actual flow rate data.

At the instant control shifts from primary 2 to primary 3, the differential applied to transducer 5 will, of course, decrease to a value of about 2.4" of water, and the transducer 5 will open switch 37. However, this will not cause the meter to revert to its low flow state because now the coil of relay 36 is maintained energized through the parallel circuit defined by switches 35 and 38. Therefore, as long as the rate of flow remains above 420 g.p.m., primary 3 will remain in control, and transducer 5 will operate the recording pen 6 in accordance with the pressure differentials which this primary produces. It will be noted that, when the flow rate rises to and then drops below 4200 g.p.m., transducer 5 will again close and then reopen switch 37. However, since, in the high flow range, switches 35 and 38 remain closed, this cycling of switch 37 will have no effect on the instrument.

When the flow rate through line 1 decreases to 370 g.p.m., the differential produced by primary 3 will be about 1.9" of water, and therefore transducer 5 will open switch 38. Since, at this time, switch 37 will be open, the coil of relay 36 will now be de-energized. After a short period, whose length depends on the time delay setting of the relay, switch 35 will open and deenergize solenoids 22, 27, 28 and 29. As a result, valves 13, 19, 23 and 24 will shift back to their illustrated positions, cylinder 12 will close the butterfly valve and bring orifice 8 into metering position, and the high flow marking pen 7 will return to its idle position. In short, the meter is now set for low flow metering. As soon as primary 2 comes on the line, the differential applied to transducer 5 will increase to a value just slightly below 240" of water, i.e., to the value produced by primary 2 at a flow rate of 370 g.p.m. This causes transducer 5 to immediately reclose switch 38. However, since switch 35 is now open, closure of switch 38 will not cause the meter to revert to its high flow mode of operation. Therefore, as long as the flow rate remains below 420 g.p.m., primary 2 will be in control.

Although the preferred embodiment affords the maximum flow range of 100:1, it will be understood that any range between this limit and 10:1 can be afforded with secondaries which are commercially available today. If a smaller range is desired, each primary can be designed to handle a sub-range equal to the square root of the total range, or the primaries can handle unequal sub-ranges whose product equals the total range. In any case, the characteristics of the two primaries are selected to satisfy the equation:

$$\frac{K_H A_H}{K_L A_L} = \frac{Q_H}{Q_L}$$

where:

$K_H$ and $K_L$ are the flow coefficients of the high flow and low flow primaries, respectively.

$A_H$ and $A_L$ are the flow areas of the high flow and low flow primaries, respectively, i.e., the area of the opening in the case of an orifice plate, and the throat area in the case of a Venturi, Dall tube or flow nozzle.

$Q_H$ and $Q_L$ are any two sets of flow rates in the high and low sub-ranges, respectively, which cause the primaries to produce the same differential.

In order to avoid misinterpretation, it should be noted that the flow coefficient of each primary is the discharge coefficient divided by the square root of the quantity $1-(A_2/A_1)^2$, where $A_2$ is the area of the orifice opening or the throat, and $A_1$ is the area of the pipe at the entrance to the primary.

The embodiment of the invention described herein is presented merely to illustrate the basic principles of the invention. Since many changes can be made in this embodiment without departing from the inventive concept, the following claims should provide the sole measure of the scope of the invention.

What is claimed is:

1. A wide range flow meter for measuring the flow of fluid through a conduit comprising
   (a) a first primary element for producing a pressure differential that varies with the rate of flow of the fluid, said primary element including a butterfly valve located in the conduit and having a vane adapted to cooperate with a seat to interrupt flow through the conduit, a metering orifice interposed in a flow passage extending through the vane, and a pair of pressure taps for sensing the pressures upstream and downstream of the butterfly valve;
   (b) a second primary element in series flow relation with the first primary element, said second element also including a pair of pressure taps between which it produces a pressure differential that varies with the rate of flow of the fluid;
   (c) a secondary element including a single differential pressure transducer having a pair of input connections, and readout means operated by the transducer;
   (d) actuating means for opening and closing the butterfly valve;
   (e) selecting means for alternately connecting the pressure taps of one or the other of the primary elements with the input connections of the transducer; and
   (f) means controlled by the secondary element for causing the selecting means to connect the taps of the second primary element with the transducer and for causing the actuating means to open the butterfly valve when the rate of flow is between a first predetermined flow rate and a maximum flow rate, and for causing the selecting means to connect the taps of the first primary element with the transducer and for causing the actuating means to close the butterfly valve when the rate of flow is between a second predetermined flow rate and a minimum flow rate;
   (g) the flow characteristics of the primary elements being so correlated that, at said first and second predetermined flow rates, the second primary produces a smaller pressure differential than the first primary.

2. A wide range flow meter as defined in claim 1 wherein the first predetermined flow rate is different from and is higher than the second predetermined flow rate.

3. A wide range flow meter as defined in claim 2 wherein the secondary element includes means for indicating or recording, at any instant of time, which primary element is connected with the transducer.

4. A wide range flow meter as defined in claim 1 wherein the second primary produces a pressure differential at said maximum flow rate which equals the differential produced by the first primary at said first predetermined flow rate.

5. A wide range flow meter as defined in claim 4 wherein the second primary produces a pressure differential at said second predetermined flow rate which is slightly smaller than the differential produced by the first primary at said minimum flow rate.

6. A wide range flow meter as defined in claim 1 wherein the second primary element is a Dall tube.

7. A wide range flow meter as defined in claim 1 wherein the second primary element is a conventional Venturi.

8. A wide range flow meter as defined in claim 1 wherein the second primary element is a flow nozzle.

9. A wide range flow meter as defined in claim 1 wherein the second primary element is a thin plate orifice.

10. A wide range flow meter as defined in claim 1 wherein the metering orifice of the first primary is a thin plate orifice.

11. A wide range flow meter as defined in claim 1 wherein the metering orifice of the first primary is a quadrant orifice.

12. A wide range flow meter as defined in claim 1 wherein the metering orifice of the first primary is a Schlag-Jorissen flow tube.

References Cited

UNITED STATES PATENTS

| | | | |
|---|---|---|---|
| 1,105,581 | 7/1914 | Rusby | 73—197 X |
| 2,574,198 | 11/1951 | Stevenson | 73—197 |

RICHARD C. QUEISSER, *Primary Examiner.*

E. D. GILHOOLY, *Assistant Examiner.*

UNITED STATES PATENT OFFICE
CERTIFICATE OF CORRECTION

Patent No. 3,410,138                                November 12, 1968

Edmond B. Lynch

It is certified that error appears in the above identified patent and that said Letters Patent are hereby corrected as shown below:

In the heading to the printed specification, line 4, "of New Jersey" should read -- of New York --.

Signed and sealed this 3rd day of March 1970.

(SEAL)
Attest:

Edward M. Fletcher, Jr.                         WILLIAM E. SCHUYLER, JR.
Attesting Officer                                          Commissioner of Patents